United States Patent [19]

Keller et al.

[11] Patent Number: 5,044,080
[45] Date of Patent: Sep. 3, 1991

[54] HAND HELD NIBBLING MACHINE

[75] Inventors: Bruno Keller, Seewis; Marco Allemann, Untervaz, both of Switzerland

[73] Assignee: Trumpf Gruesch AG, Gruesch, Switzerland

[21] Appl. No.: 621,750

[22] Filed: Nov. 30, 1990

[51] Int. Cl.$^5$ ............................................. B26B 15/00
[52] U.S. Cl. ......................................... 30/228; 30/241
[58] Field of Search ................... 30/210, 228, 241–243; 83/237, 267, 268, 467, 635

[56] References Cited

U.S. PATENT DOCUMENTS

| | | | |
|---|---|---|---|
| 2,504,405 | 4/1950 | Fletcher | 30/228 X |
| 2,888,744 | 6/1959 | Yermish | 30/228 |
| 3,025,600 | 3/1962 | Leibinger . | |
| 3,263,545 | 8/1966 | Leibinger et al. . | |
| 3,343,613 | 9/1967 | Carnesecca et al. | 30/228 X |
| 3,523,475 | 8/1970 | Leibinger et al. . | |
| 3,847,049 | 11/1974 | Bitzel . | |
| 4,748,744 | 6/1988 | Turner | 30/228 X |

FOREIGN PATENT DOCUMENTS 672857  5/1952 United Kingdom .

OTHER PUBLICATIONS

"Trumpf Nibblers" brochure, #1152/A—Trumpf, Inc.

*Primary Examiner*—Douglas D. Watts

[57] ABSTRACT

A hand-held nibbling machine has a manipulatable housing containing a motor and a transmission assembly for converting rotary motion to reciprocating linear motion. A tool assembly includes a housing portion, a ram reciprocatable in a passage in the housing portion, a base portion with a die support for supporting a die in spaced relationship to the adjacent end of the housing portion, and a neck portion between the housing and base portions providing a throat into which a workpiece may extend. Disengageable ram attachment elements are provided for securing the ram to the output coupling, and disengageable housing attachment elements are provided to secure the housing portion of the tool assembly to the manipulatable housing. An extension assembly is interposed between the tool assembly and manipulatable housing and is operative to transmit reciprocal motion from the output coupling to the ram of the tool assembly, and it comprises an elongated sleeve providing a passage therethrough and a shaft reciprocable therewithin. One end of the sleeve is engageable with the housing attachment means of the manipulatable housing, and the opposite end thereof has second housing attachment means engaged with the housing portion of the tool mounting assembly. The end of the shaft adjacent the coupling is engaged therewith by the ram attachment element and the opposite end thereof has a second ram attachment element engaged with the ram, whereby the tool assembly may be alternately mounted directly upon the manipulatable housing by disassembling the extension assembly from the tool assembly.

14 Claims, 3 Drawing Sheets

HAND HELD NIBBLING MACHINE

BACKGROUND OF THE INVENTION

The present invention relates to hand-held nibbling machines and, more particularly, to such machines which are adapted to provide a variable length between their housing and their work station.

Hand-held nibbling machines are desirably employed for making cutouts in sheet metal and plate workpieces. These cutouts may be relatively complex in configuration and may have to follow contours in the workpiece such as corrugations, ribs and the like. Exemplary of such machines are those illustrated and described in Leibinger U.S. Pat. No. 3,025,600 and in U. K. Patent No. 672,857.

Because the manipulatable housing contains the motor and transmission to convert the rotary motion of the motor to a reciprocating linear motion, its size and configuration can limit the workpieces upon which it may be used because the housing is not maneuverable within the contours of the workpiece, such as between ribs and the like. To enable nibbling in areas of workpieces with deep and/or steep contours, it is sometimes necessary to use a machine having a relatively long narrow section between the manipulatable housing and the work station defined by the cooperating punch and die. However, such a long section makes the machine more difficult to handle and it may preclude its usage in other restricted areas. Thus, it is not uncommon to have two or more machines with different lengths to enable nibbling of workpieces of different contours or different areas of the same workpiece.

It is an object of the present invention to provide a novel hand-held nibbling machine which is variable in the length between housing and the work station to enable facile utilization in cutting contoured workpieces.

It is also an object to provide such a nibbling machine in which the length of the ram may be readily varied by insertion and removal of extension members.

It is another object to provide such a nibbling machine which may be fabricated from rugged components to ensure long life and which may be readily assembled.

SUMMARY OF THE INVENTION

It has now been found that the foregoing and related objects may be readily attained in a hand-held nibbling machine which includes a manipulatable housing, a motor in the housing, and a transmission assembly within the housing connected to the motor for converting rotary motion to reciprocating linear motion and including an output coupling. A tool assembly has a housing portion providing a passage therein, a ram reciprocable in the passage, a base portion with a die support for supporting a die in spaced relationship to the adjacent end of the ram housing portion, and a neck portion between the housing and base portions providing a throat into which a workpiece may extend between the ram and die support.

The machine also includes disengageable ram attachment means for securing the ram to the output coupling, and disengageable housing attachment means for securing the housing portion of the tool assembly to the manipulatable housing. An extension assembly is interposed between the tool assembly and manipulatable housing and is operative to transmit reciprocal motion from the output coupling to the ram of the tool assembly. This assembly comprises an elongated sleeve providing a passage therethrough and a shaft reciprocatable therewithin, and the end of the sleeve adjacent the manipulatable housing is engageable with the housing attachment means of the manipulatable housing. The opposite end of the sleeve has second housing attachment means engaged with the housing portion of the tool mounting assembly. The end of the shaft adjacent the coupling is engaged therewith by the ram attachment means, and the opposite end of the shaft has second ram attachment means engaged with the ram of the tool assembly. As a result, the tool assembly may be alternately mounted directly upon the manipulatable housing by disassembling the extension assembly from the tool assembly.

Preferably, the tool assembly is engageable with the manipulatable housing and the sleeve in at least two relatively rotated positions, and desirably, the first end of the sleeve is also engageable with the manipulatable housing in at least two relatively rotated positions. In this manner, the tool assembly is rotatable to orient its neck portion in at least two positions at least 90° apart about the axis of the manipulatable housing.

In the preferred embodiment, the ram attachment means includes cooperatively threaded portions on the coupling, shaft and ram for threadably coupling the elements, and the housing attachment means includes fasteners seated in the manipulatable housing, sleeve and the housing portion. The housing portion and sleeve have bearing elements therein slidably seating the shaft and ram. Conventionally, the ram has punch mounting means at its lower end. If so desired, several extension assemblies of different lengths may be provided and any two of these may be used in various combination.

DETAILED DESCRIPTION OF PREFERRED EMBODIMENT OF THE INVENTION

Figure 1:
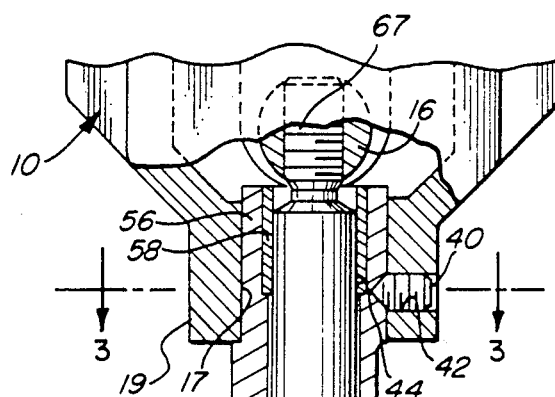
FIG. 1 is a front elevational view in partial section of a hand-held nibbling machine embodying the present invention with the tool assembly mounted directly on the manipulatable housing and with a phantom line showing of fragmentarily illustrated workpiece.
Figure 1:
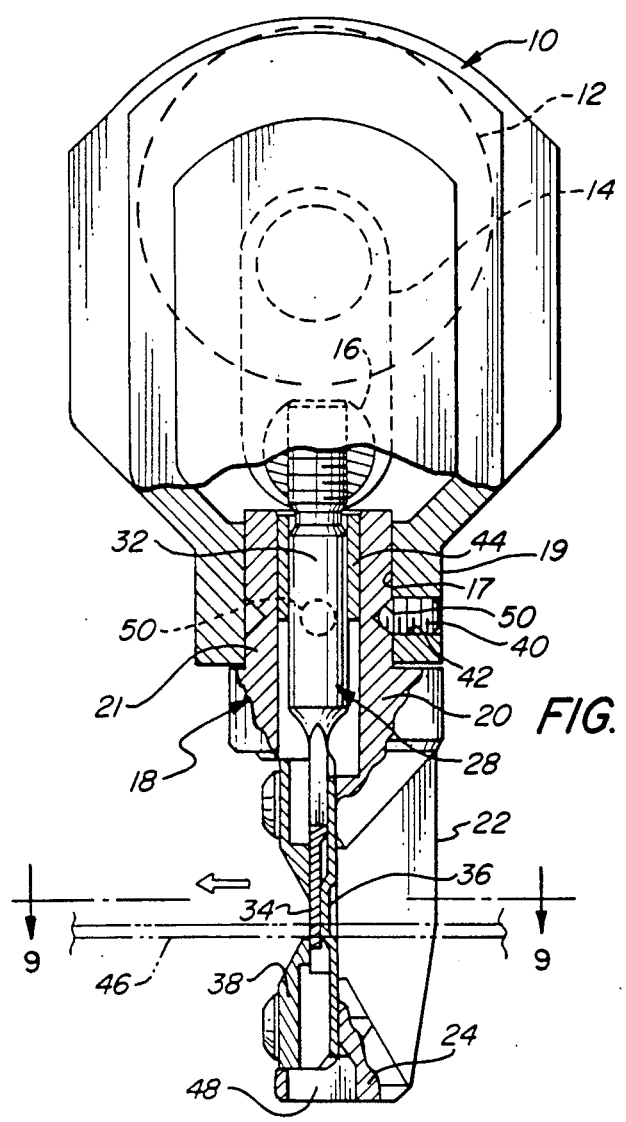

Turning first in detail to FIG. 1 of the attached drawings, therein illustrated is a hand-held nibbling machine of the type which is employed in the present invention. As is conventional, the machine includes a manipulatable housing generally designated by the numeral 10 which contains a drive motor illustrated diagrammatically in phantom line and designated by the numeral 12. It also contains a transmission generally designated by the numeral 14 for converting the rotary motion of the drive motor 12 into reciprocable linear motion directed downwardly relative to the housing 10. At its lower end, the transmission 14 has a coupling 16 with a threaded bore therein, and the depending neck 19 of the housing 10 has an axially extending passage 17.

Seated in the axial passage 17 of the housing 10 is a tool assembly generally designated by the numeral 18 which includes a housing 20 with a cylindrical portion 21 which seats within the axial passage 17 and is locked in position by the set screw 40. Extending below the housing 20 and along one side thereof, is a relatively thin neck portion 22 which has at its lower end the base portion 24.

The base portion 24 is configured to provide a seat for a die 38 having an aperture into which the lower end of the punch 34 projects as it cuts through the workpiece 46 which is illustrated in phantom line. The metal punched from the workpiece 46 by the punch 34 is discharged through the discharge passage 48.

The punch 34 is carried by the ram generally designated by the numeral 28 and which has at its upper end the threaded shank 30 which threadably seats in the coupling 16. The cylindrical body 32 of the ram 28 is slidably seated in the bearing insert 44 provided in the housing 20, and the lower end of the ram 28 is conveniently kept from sidewise motion by the axial guide 36 carried on the neck 22 and registering with an axial groove in the punch 34.

As can be seen, the set screw 40 extends through the passage 42 in the housing 10 and seats in one of several circumferentially spaced recesses 50 in the head portion 21 of the tool assembly housing 20. In this fashion, the tool assembly 18 may be rotated to several positions spaced 90° apart to change the orientation of the throat or work station relative to the manipulatable housing 10 and, thus, the direction in which it will nibble relative to the longitudinal axis of the housing 10.

Figure 3:
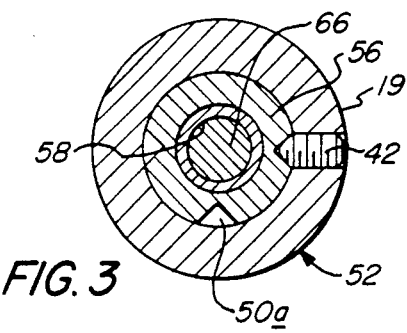
FIG. 3 is a sectional view along the line 3—3 of FIG. 2.
Figure 2:
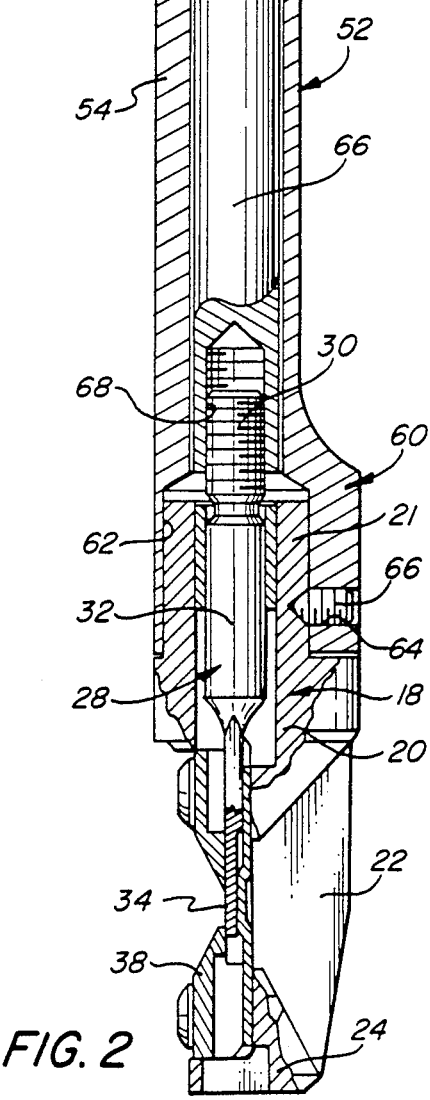
FIG. 2 is a fragmentary front elevational view with an extension assembly interposed between the tool assembly and manipulatable housing.

Turning now to FIGS. 2 and 3, therein illustrated is an extension member of the type employed in the present invention and generally designated by the numeral 52. As seen, the extension member 52 includes an elongated tubular sleeve 54 including a head portion 56 of generally cylindrical cross section which fits within the neck 19 of the housing 10, as did the tool assembly 18. At its upper end, the sleeve 54 has a recess in which is seated the sleeve bearing 58 and spaced about the periphery of the head portion 56 are a series of recesses 50a in which the set screw 42 will seat to lock the head into the housing 10.

At its lower end is a housing section generally designated by the numeral 60 having a generally cylindrical recess 62 in which the tool assembly 18 will seat. The section 60 has a radially extending aperture 64 in the sidewall thereof and which is seated a set screw 66 which will seat in one of the circumferentially spaced recesses 50 in the periphery of the housing 20 of the tool assembly 18 to lock it therein.

Slidably supported within the sleeve 54 is an elongated cylindrical shaft 66 which has a threaded shank portion 67 threadably engaged in the coupling 16, and a threaded recess 68 is provided at its lower end which receives the shank 30 of the ram 28 of the tool assembly 18. Thus, the reciprocal motion generated by the motor 12 in the housing through the transmission 14 effects the reciprocal motion of the punch 34 in the tool assembly 18 at the lower end of the extension.

Thus, with the structure of the present invention, various lengths of extensions may be provided to extend, or shorten, as the case may be the distance between the manipulatable housing 10 and the tool assembly 18. The extensions may be readily disengaged and substituted to provide the desired adjustability by removing the set screws and rotating the ram and/or extension shaft.

Figure 4:
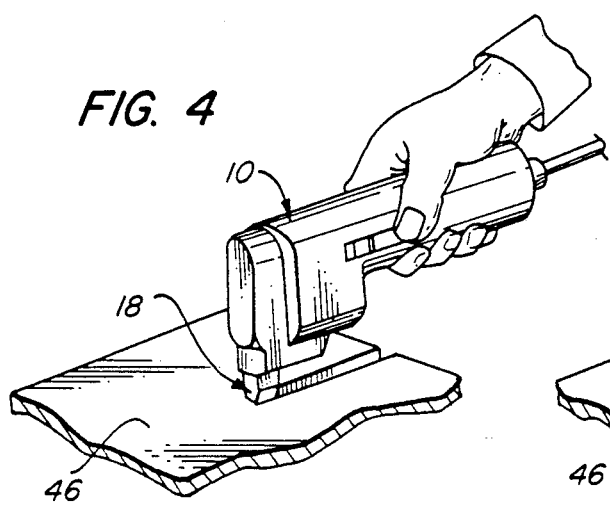
FIG. 4 is a perspective view showing the machine of FIG. 1 nibbling a fragmentary illustrated workpiece in a path extending along the longitudinal axis of the nibbling machine housing.
Figure 5:
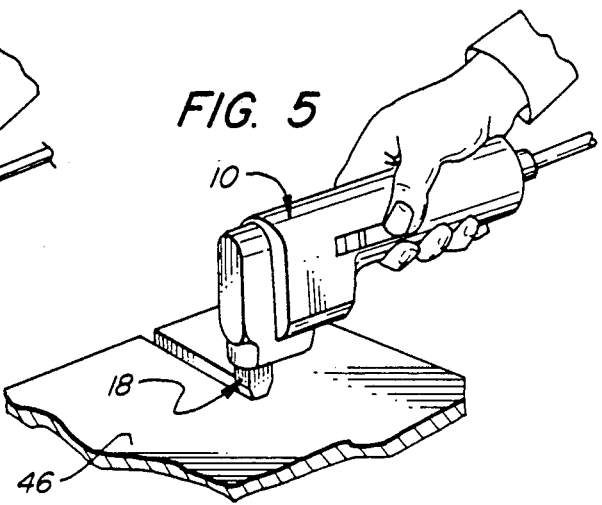
FIG. 5 is a similar view showing the machine with its tool assembly rotated 90° and nibbling along a path perpendicular to the housing axis.

Turning now to FIGS. 4–8, there is diagrammatically illustrated the adaptability of the machines of the present invention. In FIGS. 4 and 5, the tool assembly 18 is used directly mounted upon the manipulatable housing 10 and only a short distance is required.

Figure 6:
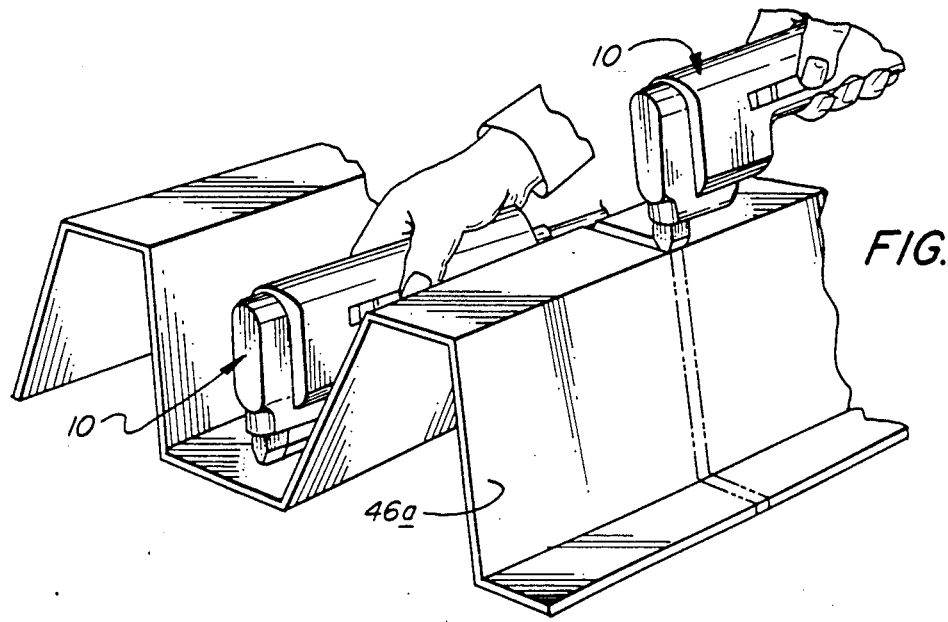
FIG. 6 is a perspective view showing the machine cutting a fragmentary illustrated corrugated workpiece at two different points.
Figure 7:
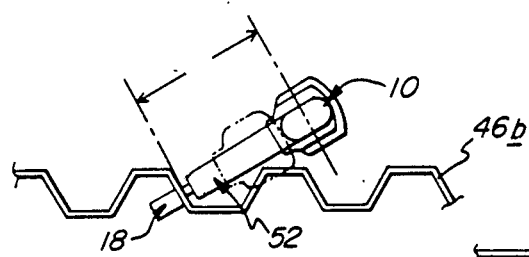
FIG. 7 is a semi-diagrammatic view of the machine with the extension member enabling the cutting of the side surfaces of the contoured workpiece which would not be possible without the extension as indicated by the phantom line showing.
Figure 8:
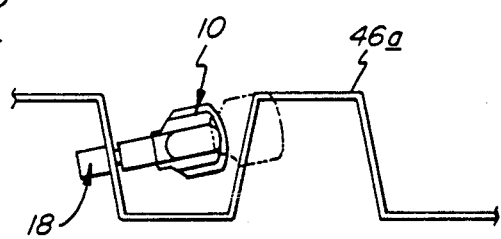
FIG. 8 is a similar view of the machine without the extension member nibbling a workpiece with a wider channel by reason of its ability to be positioned within the channel, and the phantom line shows the inability to do so with a machine having the extension.
Figure 9:
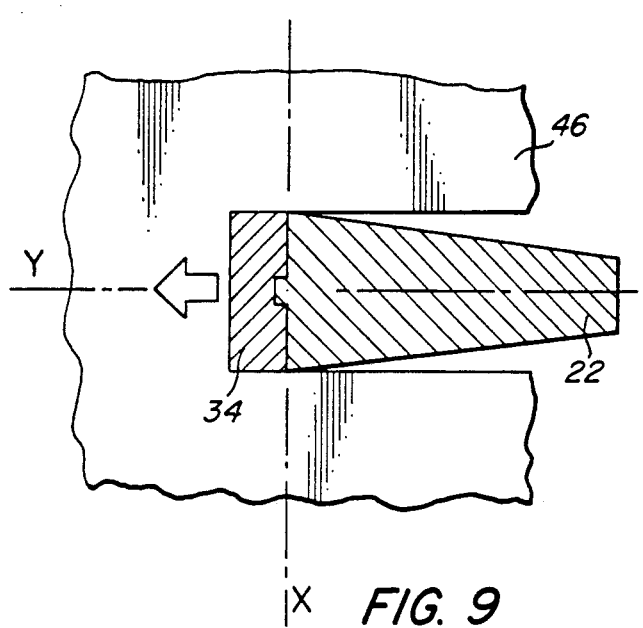
FIG. 9 is a fragmentary section view of an enlarged scale along the line 9—9 of FIG. 2.
Figure 10:
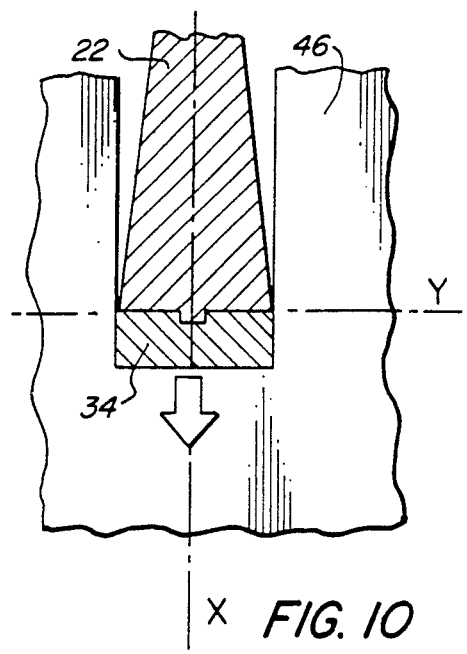
FIG. 10 is a similar view but with the tool assembly rotated 90°.
Figure 11:
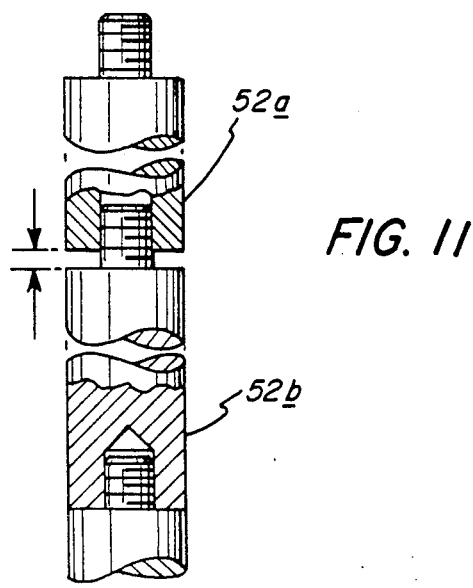
FIG. 11 is a fragmentary view of a pair of extension assemblies joined together to provide the extension from the transmission to the tool assembly.

In FIG. 6, it can be seen that the tool assembly without an extension member may be utilized to cut a contoured or corrugated workpiece 46a in areas where the manipulatable housing 10 does not present an impediment in this deeply corrugated structure. In FIG. 7, it can be seen that the manipulatable housing 10 would interfere with nibbling motion along the sidewall of the relatively shallow corrugated workpiece 46a as illustrated by the phantom line showing, and the introduction of an extension enables the displacement of the housing outwardly of the depth of the corrugations so as to allow the nibbling action to take place without interference from the housing. However, where the extension to be employed in the deeply corrugated workpiece of FIG. 8, its length would preclude the movement of the housing downwardly between the sidewalls of the corrugation.

As seen in FIGS. in 9 and 10, the rotatability of the tool assembly 18 relative to the housing 10 enables the neck 22 to be oriented in a direction which will not impede the nibbling operation. This rotation of the tool assembly may be effected by rotating the tool assembly relative to the extension, or by rotating the extension relative to the coupling.

Turning to FIG. 13, it can be seen that a pair of similar configured extension members may be employed to provide a still longer distance between the manipulatable housing and the tool assembly.

It will be appreciated that the actual configuration of the various elements may vary from those illustrated in the attached drawings, but it is desirable to provide a cylindrical on the extension shaft and a cylindrical ram to minimize the potential for wear and to provide the utmost versatility.

As is well known, various neck constructions may be employed to couple the die carrier portion of the tool assembly to the upper portion and to minimize the cross sectional area of the neck portion. However, to provide long lived structures, it is generally desirable to have a neck of relatively narrow but elongated cross section which will fit within the width of the slot nibbled by the punch as it moves therealong.

If so desired, additional bearing elements can be provided within the housing of the tool assembly, and within the sleeve of the extension.

Various means for mounting or carrying the punch at the lower end of the ram. In some instances, it may be desirable to fabricate the punch as a part of the ram so as to minimize the additional tooling and cost required to provide a punch mounting mechanism. In other instances, the punch may be threaded into, or otherwise secured in, the lower end of the ram. Similarly, it is possible to provide a structure in which the die holder, portion is configured to provide the die within which the punch operates, but this increases the potential for excessive wear and reduces the overall life of the assembly.

Thus, it can be from the foregoing detailed description and attached drawings that the hand held nibbling machine of the present invention is readily variable in length between the housing and the work station to enable its facile utilization in cutting contoured workpieces. The length of the effective ram or distance from the manipulatable housing to the work station may be readily varied by insertion and removal of extension members of differing length, or by coupling of multiple extension members. The several elements may be fabricated from rugged materials to ensure long life, and the components may be readily assembled.

Having thus described the invention, what is claimed is:

1. A hand-held nibbling machine comprising:
   (a) a manipulatable housing;
   (b) a motor in said housing;
   (c) a transmission assembly within said housing connected to said motor for converting rotary motion to reciprocating linear motion, said transmission assembly including an output coupling;
   (d) a tool assembly including a housing portion providing a passage therein, a ram reciprocable in said passage, a base portion with a die support for supporting a die in spaced relationship to the adjacent end of said housing portion, and a neck portion between said housing and base portions providing a throat into which a workpiece may extend between said ram and die support;
   (e) disengageable ram attachment means for securing said ram to said output coupling;
   (f) disengageable housing attachment means for securing said housing portion of said tool assembly to said manipulatable housing; and
   (g) an extension assembly interposed between said tool assembly and manipulatable housing and operative to transmit reciprocal motion from said output coupling to said ram of said tool assembly, comprising an elongated sleeve providing a passage therethrough and a shaft reciprocable therewithin, the end of said sleeve adjacent said manipulatable housing being engageable with said housing attachment means and of said manipulatable housing the opposite end thereof having second housing attachment means engaged with said housing portion of said tool mounting assembly, the end of said shaft adjacent said coupling being engaged therewith by said ram attachment means and the opposite end thereof having second ram attachment means engaged with said ram, whereby said tool assembly may be alternately mounted directly upon said manipulatable housing by disassembling said extension assembly from said tool assembly.

2. The hand-held nibbling machine in accordance with claim 1 wherein said tool assembly is engageable with said manipulatable housing and said sleeve in at least two relatively rotated positions.

3. The hand-held nibbling machine in accordance with claim 2 wherein the first end of said sleeve is also engageable with said manipulatable housing in at least two relatively rotated positions.

4. The hand-held nibbling machine in accordance with claim 3 wherein said tool assembly is rotatable to orient said neck portion in at least two positions at least 90° apart about the axis of said manipulatable housing.

5. The hand-held nibbling machine in accordance with claim 1 wherein said ram attachment means includes cooperatively threaded portions on said coupling, shaft and ram for threadably coupling said elements.

6. The hand-held nibbling machine in accordance with claim 1 wherein said housing attachment means includes fasteners seated in said manipulatable housing, sleeve and said housing portion.

7. The hand-held nibbling machine in accordance with claim 1 wherein said housing portion and sleeve have bearing elements therein slidably seating said shaft and ram.

8. The hand-held nibbling machine in accordance with claim 1 wherein said ram has punch mounting means at its lower end.

9. The hand-held nibbling machine in accordance with claim 1 wherein there is included a second extension assembly between said first mentioned extension assembly and said manipulatable housing.

10. A hand-held nibbling machine comprising:
   (a) a manipulatable housing;
   (b) a motor in said housing;
   (c) a transmission assembly within said housing connected to said motor for converting rotary motion to reciprocating linear motion, said transmission assembly including an output coupling;
   (d) a tool assembly including a housing portion providing a passage therein, a ram reciprocable in said passage, a base portion with a die support for supporting a die in spaced relationship to the adjacent end of said housing portion, and a neck portion between said housing and base portions providing a throat into which a workpiece may extend between said ram and die support;
   disengageable ram attachment means for securing said ram to said output coupling;
   (f) disengageable housing attachment means for securing said housing portion of said tool assembly to said manipulatable housing; and
   (g) an extension assembly interposed between said tool assembly and manipulatable housing and operative to transmit reciprocal motion from said output coupling to said ram of said tool assembly, comprising an elongated sleeve providing a passage therethrough and a shaft reciprocable therewithin, the end of said sleeve adjacent said manipulatable housing being engageable with said housing attachment means and of said manipulatable housing the opposite end thereof having second housing attachment means engaged with said housing portion of said tool mounting assembly, the end of said shaft adjacent said coupling being engaged therewith by said ram attachment means and the opposite end thereof having second ram attachment means engaged with said ram, said tool assembly being engageable with said manipulatable housing and said sleeve in at least two relatively rotated positions, said ram attachment means including cooperatively threaded portions on said coupling, shaft and ram for threadably coupling said elements, whereby said tool assembly may be alternately mounted directly upon said manipulatable housing by disassembling said extension assembly from said tool assembly.

11. The hand-held nibbling machine in accordance with claim 10 wherein the first end of said sleeve is also engageable with said manipulatable housing in at least two relatively rotated positions.

12. The hand-held nibbling machine in accordance with claim wherein said tool assembly is rotatable to orient said neck portion in at least two positions at least 90° apart about the axis of said manipulatable housing.

13. The hand-held nibbling machine in accordance with claim wherein said housing attachment means includes fasteners seated in said manipulatable housing, sleeve and said housing portion.

14. The hand-held nibbling machine in accordance with claim wherein said housing portion and sleeve have bearing elements therein slidably seating said shaft and ram.

* * * * *

UNITED STATES PATENT AND TRADEMARK OFFICE
CERTIFICATE OF CORRECTION

PATENT NO. : 5,044,080

DATED : September 3, 1991

INVENTOR(S) : Bruno Keller and Marco Allemann

It is certified that error appears in the above-identified patent and that said Letters Patent is hereby corrected as shown below:

Column 6, line 54, before "disengageable", insert --(e)--.

Column 8, line 6, after "claim", insert --11--; line 10, after "claim", insert --10--; line 14, after "claim", insert --10--.

Signed and Sealed this

Third Day of November, 1992

Attest:

DOUGLAS B. COMER

Attesting Officer

Acting Commissioner of Patents and Trademarks